United States Patent [19]
Kusz et al.

[11] 3,810,413
[45] May 14, 1974

[54] PROGRESSIVE POT BROACH SYSTEMS

[75] Inventors: Raymond S. Kusz, Mt. Clemens; Arthur B. Bassoff, Oak Park, both of Mich.

[73] Assignee: Lear Siegler, Inc., Santa Monica, Calif.

[22] Filed: Oct. 2, 1972

[21] Appl. No.: 294,383

[52] U.S. Cl............................ 90/10, 90/86, 90/71
[51] Int. Cl............................................. B23f 1/08
[58] Field of Search .......... 90/1, 10, 86, 71, 72, 73, 90/79, 77, 80, 83, 84

[56] References Cited
UNITED STATES PATENTS

| | | | |
|---|---|---|---|
| 3,670,625 | 6/1972 | Skalsey | 90/86 |
| 2,382,628 | 8/1945 | Green | 90/86 X |
| 2,365,040 | 12/1944 | Averill et al. | 90/86 X |
| 3,656,401 | 4/1972 | Psenka | 90/10 |
| 2,461,320 | 2/1949 | Green | 90/10 |
| 2,102,071 | 12/1937 | Hart | 90/86 X |

Primary Examiner—Andrew R. Juhasz
Assistant Examiner—Z. R. Bilinsky
Attorney, Agent, or Firm—Whittemore, Hulbert & Belknap

[57] ABSTRACT

A broach system for broaching external gears comprising a plurality of separate broach units each comprising a generally tubular pot broach and a pusher located beneath the broach for receiving a work piece and pushing it upwardly through the broach. A work piece partially finished by one of the broach units is advanced into alignment in properly indexed position to the next broach unit.

9 Claims, 6 Drawing Figures

PATENTED MAY 14 1974 3,810,413
SHEET 1 OF 2
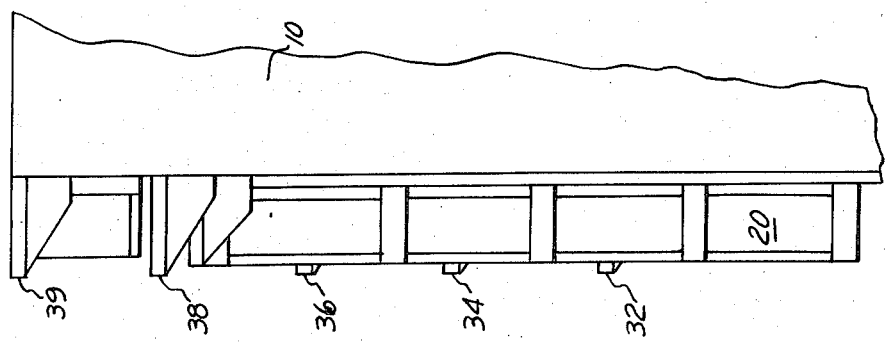
FIG. 2
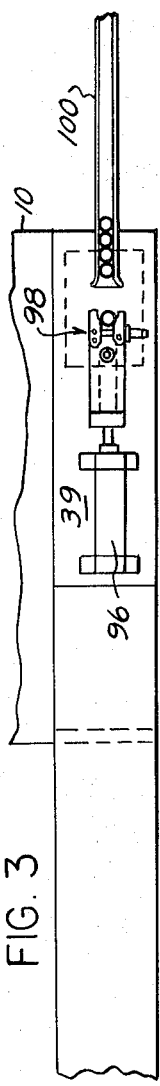
FIG. 3
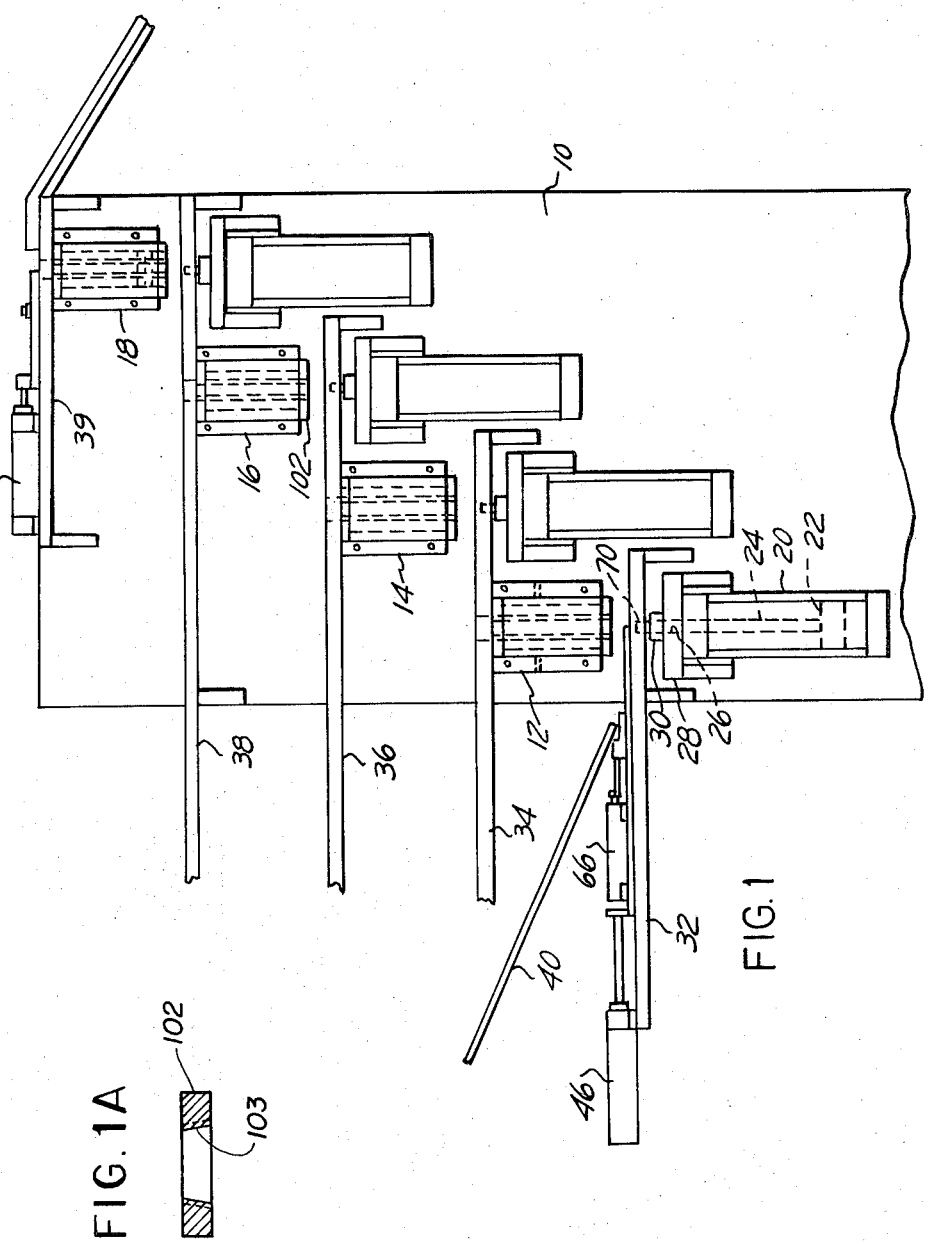
FIG. 1A
FIG. 1

PROGRESSIVE POT BROACH SYSTEMS

BRIEF SUMMARY OF THE INVENTION

It has been found that where a pot broaching operation requires a relatively large number of successive cutting actions by broach teeth, the means for effecting relative longitudinal advance between the broach and the work piece exhibits rapidly diminishing stiffness or rigidity upon variation in length. This is particularly true where, as is desirable for many reasons, the broaching operation involves a pot broach having radially inwardly projecting teeth adapted to cut teeth such as gear teeth on the periphery of a work piece. In this case it is desirable to position the generally tubular pot broach with its axis vertical and to push the work piece upwardly through the broach by means of a pusher located below the broach.

In order to retain the advantage of the arrangement described above while maintaining the rigidity required for an accurate broaching operation, the present invention involves dividing the broaching operation into a number of components. In order to accomplish this a progressive broach system is provided comprising a plurality of separate pot broach units located in laterally separated and preferably vertically stepped juxtaposition together with means for locating a cylindrical work piece at the first broach unit and for transferring partially broached work pieces between successive adjacent pairs of units.

The foregoing is accomplished by providing a slide associated with each pot broach adapted to receive a work piece in properly located position and to advance it into a properly aligned and indexed position intermediate the next successive pusher and broach of the following unit.

BRIEF DESCRIPTION OF THE DRAWINGS

FIG. 1 is an elevational view of a broach system in accordance with the present invention.

FIG. 1A is a sectional view through a guide plate used at the bottom of a broach.

FIG. 2 is a side view of the system seen in FIG. 1.

FIG. 3 is a fragmentary plan view of the system.

DETAILED DESCRIPTION

Figure 4:
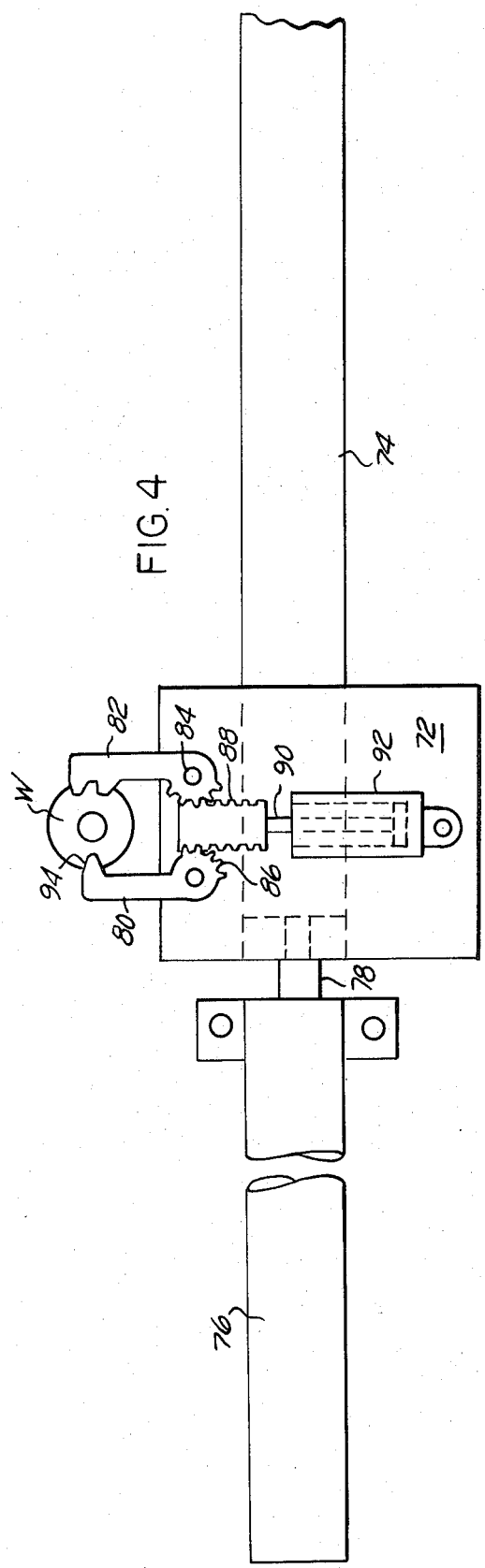
FIG. 4 is an enlarged plan view of transfer mechanism.

Referring first to FIGS. 1, 2 and 3, the broach system comprises a rigid stationary support or frame 10 on which are mounted a plurality of pot broaches 12, 14, 16 and 18. Each pot broach is of generally tubular construction and is provided with a multiplicity of radially inwardly projecting cutting teeth. The cutting teeth are arranged in a multiplicity of series of teeth, the teeth of each series being in longitudinal alignment and progressively stepped.

Where the work piece is in the form of a spur gear the teeth of each series extend in axial alignment. However, when the work piece is a helical gear, the teeth of each series extend in a corresponding helical configuration. The term "longitudinal alignment" is intended to cover the arrangement appropriate for either spur or helical teeth.

In addition, the teeth of each broach 12, 14, 16 and 18 are progressively stepped so that a work piece having tooth spaces partially cut by the broach 12 has these spaces cut progressively deeper or wider or both, by the teeth of the broach 14, and the same situation exists with the successive broaches 16 and 18.

By providing relatively short broaches 12, 14, 16 and 18, it is possible to provide stiffer or more rigid means for pushing the work piece through the separate relatively short broach. Associated with each of the broaches 12, 14, 16 and 18 is a pusher 20 in the form of a cylinder having a piston 22 therein and a piston rod 24 connected to the piston. The piston rod 24 extends through an opening 26 in a top plate 28. Connected to the piston rod 24 is a pusher element 30 which may be dimensioned to engage a work blank centrally thereof and to leave the peripheral portion thereof free for engagement by the progressively stepped broach teeth. The extension of the piston rod 24 or the pusher rod connected thereto, above the guide plate 20, thus determines the stiffness of the pusher. Since the stiffness varies generally in accordance with the square of the unsupported length, it will be appreciated that substantial increases in rigidity are available by shortening the length of each broach.

Mounted on the rigid frame 10 are platforms 32, 34, 36, 38 and 39. The platform 32 and associated structure is for advancing a blank work piece to position to be pushed through the first broach 12. For this purpose there is provided an inclined slide 40 down which a succession of work pieces is advanced, the foremost work piece being released by suitable conventional means for deposit on the platform 32.

Figure 5:
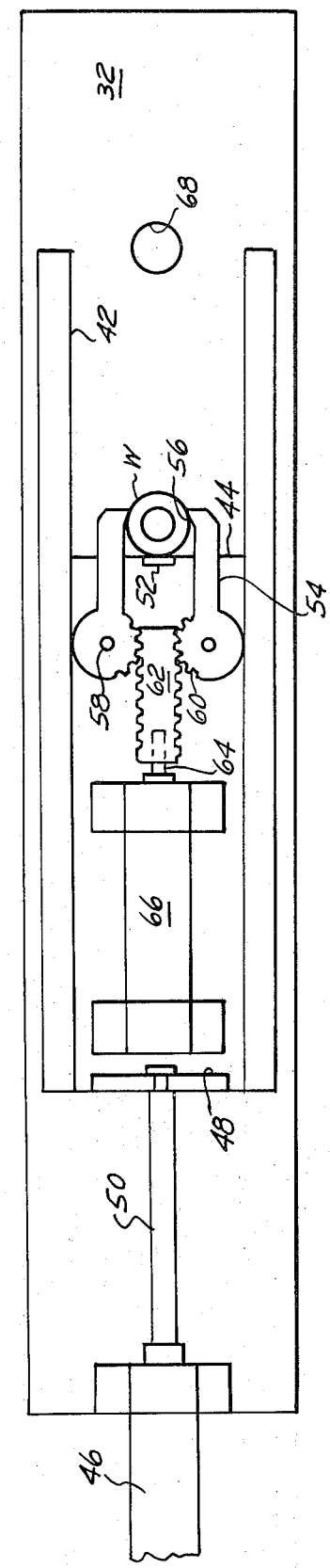
FIG. 5 is an enlarged plan view of the loading mechanism.

Referring now to FIGS. 4 and 5, the details of the mechanism for initially loading the work piece into aligned position between the pusher and the first broach 12, is illustrated. Secured to the platform 32 by guides indicated at 42 is a loading slide 44 connected to a piston in a loading cylinder 46 carried by the platform. The connection is through a bracket 48 on the slide and a connecting rod 50 extending to the cylinder 46. On the slide 44 is a locating abutment 52 and a pair of locating cam arms 54 having cam surfaces 56 shaped to engage the periphery of a cylindrical work piece W and to cam it into engagement with the locating abutment surface 52. For this purpose the arms 54 are pivoted to the slide 44 as indicated at 58, the pivot points 58 being located at opposite sides of the longitudinal path of advance of the work piece as determined by the guides 42. Preferably, the arms 54 are provided with toothed sectors 60 in mesh with the teeth of an actuating rack 62 which is connected to a rod 64 extending from a fluid piston and cylinder device 66. The rack and pinion connection to the arms 54 insures the simultaneous equal swinging movement thereof and thus insures accurate locating of the work piece W with reference to the slide. After the work piece has been clamped in located position as illustrated in FIG. 5, fluid is admitted to the cylinder 46 which advances the work piece into position overlying an opening 68 in the platform 32, which is in alignment with the axes of the pusher 30 and the broach 12 of the first broach unit.

While the blank W is held in position by the arms 54, fluid is admitted to the cylinder 20 and the pusher 30 moves upwardly through the opening 68. Conveniently, the pusher may include a pilot 70 which is adapted to enter into the central opening usually provided in the work piece. The fluid pressure is reversed in the cylinder 66 and the arms 54 are swung outwardly away from the work piece W and thereafter fluid is reversed in the piston and cylinder device 46 and the slide 44 is returned to the starting position illustrated in FIG. 5.

The work piece which has been deposited on the platform 32 and maintained in alignment with the initial broach 12 and its pusher 30, is now pushed upwardly through the first broach into a position above the platform 34. At this time the partially broached work piece is gripped in accurately located and indexed position and is advanced into an aligned position between the second broach 14 and its associated pusher. The mechanism for effecting this advance of the partially broached work piece between adjacent pairs of broaches is best illustrated in FIG. 4. A slide 72 is mounted on a guide 74, the slide being connected to the piston of a fluid piston and cylinder device 76 by a connecting rod 78. Mounted on the slide 72 are a pair of advancing arms or jaws 80 and 82, these arms being pivoted to the slide as indicated at 84. Preferably, each of the arms has a toothed sector 86 and these are in mesh with a double rack 88 connected to the piston rod 90 of a fluid piston and cylinder device 92 also carried by the slide 72. Inasmuch as the transfer mechanism is for advancing partially broached teeth, the free ends of the arms or jaws 80 and 82 are provided with toothed shaped projections 94. It will be appreciated that if the gear or similar work piece has an even number of teeth, its tooth spaces are directly opposite each other, and that if it has an odd number of teeth, a tooth space at one side thereof is diametrically opposite a tooth at the opposite side thereof. The location of the toothed shaped projections 94 takes this into account and they are shaped and located to engage in partially cut tooth spaces so as to advance the partially broached work pieces in properly indexed relation. The work piece which has been advanced into position above the platform 34 is thus advanced by the jaws 80 and 82 across the top surface of the platform 34 into position between the second broach and the pusher associated therewith. Inasmuch as the jaws 80 and 82 of each intermediate transfer device for advancing partially finished work pieces must be returned to a starting position in which the next successive partially broached work piece may have already been positioned above the platform, it is necessary to provide clearance to accommodate this possibility. Accordingly, it will be observed that the pivots 84 of the arms or jaws 80, 82, are located at the same side of the path of advance of the work piece W. Moreover, the rack and toothed sector connection to the arms 80 provide substantially 90° movement of each so that when they are swung to released position they may be returned to engage the next successive work piece without interference.

In practice, the finished work piece will be gripped as illustrated in FIG. 4, after which the slide 72 will be advanced to the right to position the partially broached work piece over the opening provided in platform 32 for passage of the pusher 30.

After the work piece has been successively broached in the broaches 12, 14, 16 and 18, it is positioned above the platform 39 in finished condition and the pusher associated with the broach 18 is returned to down position. At that time the ejection mechanism best illustrated in FIG. 3, is operated. A piston and cylinder device 96 is connected to ejector means 98 which push the finished work gear into the open end of the discharge chute 100.

While there has been described means for positioning a work piece blank or a partially broached work piece in exact alignment with the broach which is to perform the next operation, it is desirable in most cases to provide guide plates 102 at the lower end of the broach having inclined guiding surfaces 103 as seen in FIG. 1A to insure entrance of the work piece into the broach in precisely registered position. It may be noted at this time that the work piece is maintained in centered position by the action of the cutting broach teeth located in equally spaced relation around the periphery of the work piece.

It will be appreciated that conventional control circuitry is provided to insure properly timed relation between the various piston and cylinder devices 20, 36, 66, 76 and 96 in that each work piece will be gripped by the jaws 54, or 80, 82 in a definitely predetermined position. Thereafter, the feed or advancing cylinders operate to position the work piece precisely in alignment with the broach which is to perform the next cutting operation. Thereafter, the appropriate piston and cylinder unit of the associated pusher device is actuated. The gripping jaws will usually be released before upward movement of the work piece although this is not strictly necessary.

However, while the relationship between actuation of the gripping, locating and work pushing steps of each broach unit must be accurately related, it is not necessary to insure exactly simultaneous or exactly sequential operation between the broach units containing the broaches 12, 14, 16 and 18. It is however, essential that all broaching operations shall be completed before the next series of broaching operations commence.

It is not considered necessary to illustrate the devices which insure proper sequence of operation, but it will be appreciated that limit switches may be positioned to be operated by the racks 62 or 88 when they are in position to insure proper initial location of a work piece. Similarly, a limit switch responsive to advance movement of the slides 44 or 72 may be used to delay operation of the associated pusher element until the slides have advanced to the position which locates the work piece properly with respect to the successive broach. A limit switch responsive to the position of the pusher elements 30 as they move to advanced position, may signal completion of the broaching operation and initiate return movement of the pusher or release movement of the clamping jaws, or both. Further limit switches responsive to movement of the pistons 62 and 88 may signal release of the work piece and initiate return movement of the slides 44, 72.

In general terms, the timing of the sequential operations is determined by limit switches actuated by completion of a movement taking place during the preceding operation.

While the specific application of the invention as described above relates to forming externally toothed articles such as gears, splines, sprockets and the like, the invention is applicable to any part capable of being shaped in a pot broach, and articles such as cams or lobed parts may be produced by the system disclosed herein.

What we claim as our invention is:

1. A progressive broach system comprising a plurality of separate pot broach units comprising at least a first and a final broach each of which comprises a tubular pot broach positioned with its axis vertical and having radially inwardly projecting broach teeth arranged in circumferentially spaced groups, the teeth of each group being stepped to take a series of cuts to increased depth, a pusher located beneath each broach and including a support to receive a work piece and to push it vertically through the associated broach, said broaches except the first having teeth arranged to enlarge the cuts formed by the series of teeth of the preceding broach, loading means associated with the first broach unit to move a work piece horizontally onto its associated pusher in alignment with its broach, and advancing means intermediate each adjacent pair of broach units to receive a partially broached work piece from one unit to advance it horizontally and to position it on the pusher of the other unit in axial alignment with the broach thereat and in indexed alignment with the teeth thereof, said units being arranged at progressively higher levels so that a partially broached work piece is advanced substantially horizontally between adjacent broach units.

2. A system as defined in claim 1 in which said loading means comprises a horizontal platform having a smooth upper surface on which a work piece is slidable, a loading slide, a locating abutment on said loading slide for engagement with a round, flat work piece, a pair of loading jaws pivoted to said loading slide and having cam surfaces shaped to locate to round work piece midway between said loading jaws and against said abutment.

3. A system as defined in claim 2 in which said locating abutment is intermediate said jaws and has an abutment surface perpendicular to the direction of advance of said loading slide, and said loading jaws are pivoted to said loading slide at opposite sides of the path of advance of the work piece.

4. A progressive broach system comprising a plurality of separate pot broach units comprising at least a first and a final broach each of which comprises a tubular pot broach having radially inwardly projecting broach teeth arranged in circumferentially spaced groups, the teeth of each group being stepped to take a series of cuts to increased depth, a pusher located beneath each broach and including a support to receive a work piece and to push it vertically through the associated broach, said broaches except the first having teeth arranged to enlarge the cuts formed by the series of teeth of the preceding broach, loading means associated with the first broach unit to position a work piece on its associated pusher in alignment with its broach, and advancing means intermediate each adjacent pair of broach units to receive a partially broached work piece from one unit and to advance and position it on the pusher of the other unit in axial alignment with the broach thereat and in indexed alignment with the teeth thereof, said advancing means comprising an advancing slide, a pair of advancing jaws pivoted to said advancing slide and having teeth at the movable ends thereof to engage in partially broached tooth spaces at substantially opposite sides of a partially broached work piece.

5. A system as defined in claim 4 comprising means for swinging said advancing jaws simultaneously to engage the front and rear sides of a partially broached work piece, and in which the pivots of said advancing jaws are located at one side of the path of advance of work pieces and said advancing jaws open sufficiently to clear the next successive work piece on return of the slide to starting position.

6. A system as defined in claim 2 in which said advancing means comprises an advancing slide, a pair of advancing jaws pivoted to said advancing slide and having teeth at the movable ends thereof to engage in partially broached tooth spaces at substantially opposite sides of a partially broached work piece.

7. A system as defined in claim 6 comprising means for swinging said advancing jaws simultaneously to engage the front and rear sides of a partially broached work piece, and in which the pivots of said advancing jaws are located at one side of the path of advance of work pieces and said advancing jaws open sufficiently to clear the next successive work piece on return of the slide to starting position.

8. A system as defined in claim 7 comprising independently operated means for actuating the jaws, slide, and pusher of each broach unit in properly timed relation independent of the operation of adjacent broach units.

9. A system as defined in claim 1 comprising guide means having inclined work engaging surfaces provided at the lower end of each broach to insure precise alignment between the work piece and the broach as the work piece initially engages the cutting teeth at the lower end of the broach.

* * * * *